(12) United States Patent
Foulkes et al.

(10) Patent No.: US 6,519,643 B1
(45) Date of Patent: Feb. 11, 2003

(54) METHOD AND SYSTEM FOR A SESSION ALLOCATION MANAGER ("SAM")

(75) Inventors: Jonathan Foulkes, Big Canoe, GA (US); Frank Steinmann, Alpharetta, GA (US)

(73) Assignee: Attachmate Corporation, Bellevue, WA (US)

( * ) Notice: Subject to any disclaimer, the term of this patent is extended or adjusted under 35 U.S.C. 154(b) by 0 days.

(21) Appl. No.: 09/301,775

(22) Filed: Apr. 29, 1999

(51) Int. Cl.[7] .............................................. G06F 13/00
(52) U.S. Cl. .................. 709/227; 709/228; 709/223
(58) Field of Search ............................... 709/227, 223, 709/203, 228, 229

(56) References Cited

U.S. PATENT DOCUMENTS

| | | | | |
|---|---|---|---|---|
| 5,642,515 A | * | 6/1997 | Jones et al. ................. 710/220 |
| 5,802,306 A | * | 9/1998 | Hunt .......................... 709/228 |
| 6,085,247 A | * | 7/2000 | Parsons, Jr. et al. ........ 709/227 |
| 6,138,120 A | * | 10/2000 | Gongwer et al. ............. 707/10 |
| 6,349,337 B1 | * | 2/2002 | Parsons, Jr. et al. ........ 709/227 |
| 2001/0042106 A1 | * | 11/2001 | Kim ........................... 709/218 |

FOREIGN PATENT DOCUMENTS

WO    WO 99/26159    * 5/1999

* cited by examiner

*Primary Examiner*—Kenneth R. Coulter
(74) *Attorney, Agent, or Firm*—Seed IP Law Group PLLC

(57) ABSTRACT

A Session Allocation Manager ("SAM") manages multiple client connections to a limited number of host terminal sessions. The SAM also minimizes the latency involved in creating and terminating a host session. The SAM may reside on a server in the communication path between the client and the host session. Host data objects may use the SAM to associate a client connection to a host session. The SAM monitors the session activity and enforces inactivity timeouts. The SAM also attempts to reestablish a host session when it fails. In an environment having only a limited number of available terminal sessions, the SAM may control the session by creating a session window. A connection mechanism directed by the client may then request a session window from the SAM. If multiple clients ask for the same connection mechanism, the SAM may dedicate a particular session window to a particular type of connection mechanism.

53 Claims, 8 Drawing Sheets

METHOD AND SYSTEM FOR A SESSION ALLOCATION MANAGER ("SAM")

TECHNICAL FIELD

The present invention relates to computer programming and, in particular, to a method and system for maintaining sessions with a host computing application and securely allocating the sessions to a client computing application.

BACKGROUND OF THE INVENTION

The growth of the Internet presents software developers with new market demands and new options for publishing data stored on enterprise computing systems, such as mainframe computers and mid-range computers like IBM's AS/400 series. Enterprise computing systems refer to the entire computing system for a whole corporation, especially computing systems spanning across the various locations in which a corporation maintains offices. Thus, enterprise computing refers to the computing system of the whole corporate enterprise. Enterprise computing typically includes those computing applications upon which a corporation derives a great deal of its revenues, such as order entry, accounts receivable, payroll, and inventory. An enterprise network refers to systems such as wide area networks ("WANs"), local area networks ("LANs"), and Internet working bridges. An enterprise solution typically pertains to software that enables individuals and groups within a large corporation to use computers in a network environment to access information from a wide range of sources, collaborate on projects, and communicate easily with text, graphics, video, or sound.

Many corporations, and other large organizations, would like to develop applications that display, format, and manipulate data from their host legacy enterprise applications in ways that are not possible with the conventional character mode, screen-based applications available on their host enterprise computing systems. A legacy system, such as that provided by screen-based host enterprise computing systems, refers to a computer program, network, or other computing element that remains in use after a business or organization has installed new computing systems, such as a graphical user interface ("GUI") program. Each department within the corporation may wish to develop its own custom view of the enterprise data available on the host enterprise computing system. For example, the sales department may wish to view the enterprise data required for sales forecasting in a graphical format. The marketing department may wish to publish a sales catalog on an Internet web server and provide dynamically updated inventory information. The accounts receivable department may wish to sort payment records according to the amount owed or the length of time the balance has been outstanding. Such customization is cumbersome at best, and perhaps impossible, using conventional screen-based host applications.

Many corporations would also like to migrate their data storage mechanisms to new computing environments without affecting the enterprise applications that rely upon the stored enterprise data. Screen-based host applications typically run on large to medium-size computing systems, such as IBM mainframes, IBM AS/400s, Unisys computers, and Digital VAX computing systems. Applications for such computing systems have typically been designed for use with character mode terminals and are based on individual screens. Character mode terminals, also known as text mode terminals or alphanumeric mode terminals, display letters, numbers, and other text characters but not graphical images or WYSIWYG ("what-you-see-is-what-you-get") character formatting, such as italics and superscript. Some conventional emulation systems have been developed that emulate character mode terminals on more modern PC-based computing systems in order to interface with host applications. However, these emulation systems are both cumbersome and limited in their capabilities.

In conventional host enterprise computing systems, a screen-based application program accesses enterprise host computer data primarily through host terminal screens. The screen-based host interface, leftover from the early days of computing, has become outdated, unfamiliar, and cumbersome in the modern world of point-and-click GUI applications. In this new world of computing, many corporations want to transition from screen-based applications to user-friendly GUI applications without disrupting mission-critical business processes. This new computing environment challenges programmers to make sure that enterprise host data is manageable, secure, and consistently available to clients. In a LAN or on the Internet, a "client" refers to a computer that accesses shared network resources provided by another computer, known as a "server."

SUMMARY OF THE INVENTION

Embodiments of the present invention provide a Session Allocation Manager ("SAM") that manages multiple client connections to a limited number of host sessions available from a host computing application. The SAM also minimizes the latency involved in creating and terminating a host session for the client computing system that requested the session. Embodiments of the SAM may establish connections with screen-based host applications, customer information control system ("CICS") applications, and database applications.

Embodiments of the SAM reside on a server in the communication path between a client application and a host application, and data objects may use the SAM to associate a client connection with a host session. The SAM monitors session activity between the client and the host, and enforces inactivity timeouts. The SAM also attempts to reestablish a connection to a host session when the connection fails.

In an environment having only a limited number of available sessions, the SAM controls a client's session requests for a host application by creating one or more sessions with the host application and then allocating one of the sessions to the client upon request. For example, a connection mechanism associated with the client application may request a session from the SAM for connection to the host, according to an embodiment of the invention. After the connection mechanism has received the session, then the connection mechanism may transmit data between the client application and the host application via the SAM. If multiple client applications share a connection mechanism, the SAM may dedicate a particular session to that connection mechanism. The SAM performs a vital management function, and in its absence client-host communications may not perform as efficiently or as securely as possible.

Embodiments of the invention provide a method and system for managing multiple connections between client computing applications and host computing applications that have a limited number of available connections. With each request from a session client application to allocate a session, the SAM receives a session name. The SAM matches the session name with a session name in its pre-existing collection of session names. The SAM then accesses a session having the matching session name. The SAM connects the host to the session and allocates the session to the client. For each request from a client application to transfer data with host, the SAM receives configuration objects that include access methods for exchanging data between the host and the client. The SAM manages the resulting data transfer between the client and the host, according to an embodiment of the invention.

Embodiments of the invention provide a SAM having a first object interface that includes methods and properties for creating and controlling sessions between hosts and clients. An object interface contains a set of logically related function members. For example, if an object were a "word processor," one interface may perform edits and have function members such as "delete." Each session contains directions for managing communications between a client and a host. The SAM also provides a second object interface that accesses a session and allocates the session to the client requesting the session. The SAM further provides a third object interface that establishes a session interface with the host and makes a session communications link available to the client.

Embodiments of the invention provide a computer-readable medium holding computer-executable instructions for performing a method for managing connections between clients and hosts. For each connection request from a client, the SAM receives a host name and a session name. The SAM then accesses a session matching the session name and allocates the session to the client.

BRIEF DESCRIPTION OF THE DRAWINGS

A preferred embodiment of the present invention will be described below relative to the following figures. Note that similar elements and steps in the figures have the same reference number.

DETAILED DESCRIPTION OF THE INVENTION

Figure 1:
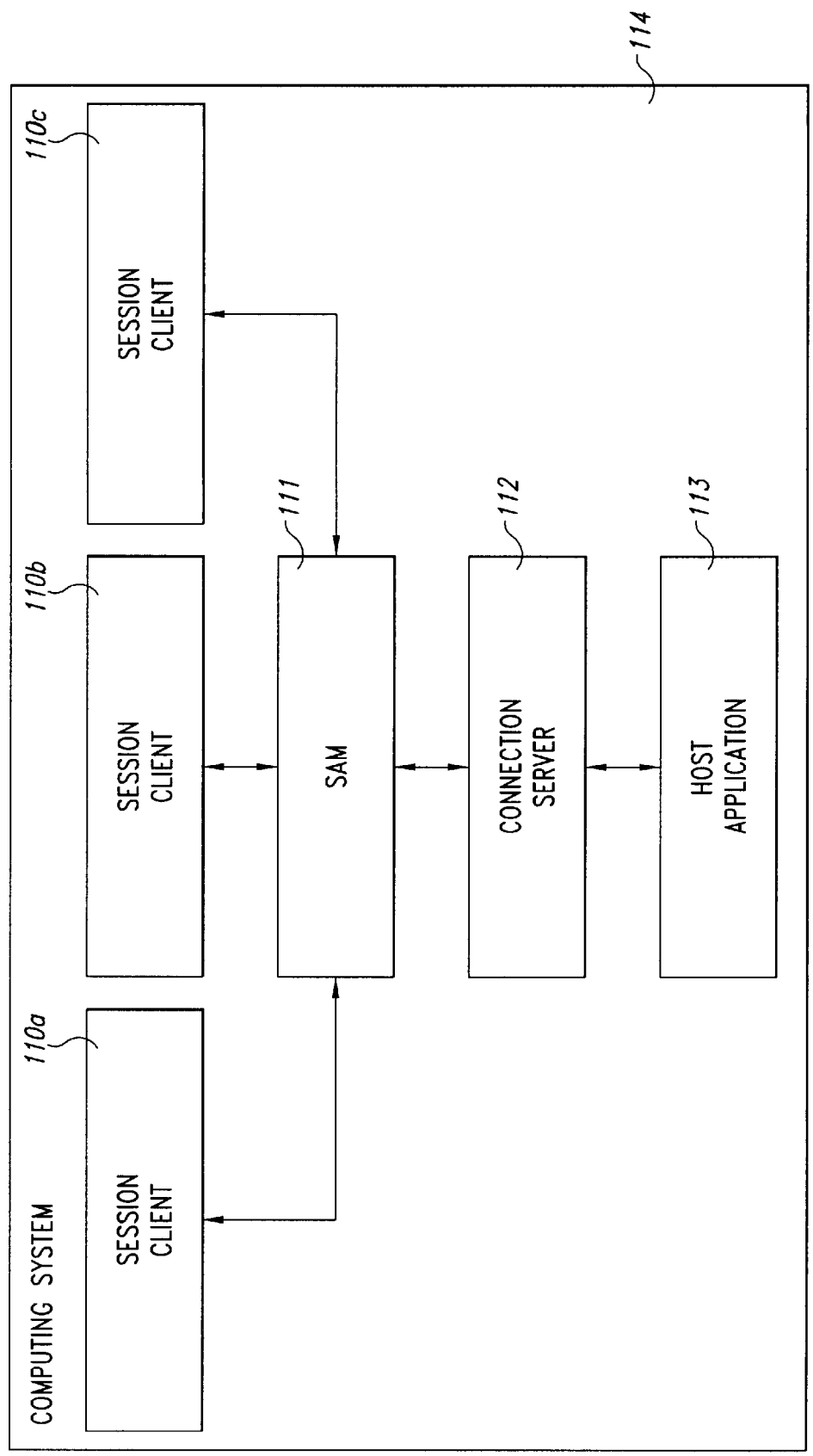
FIG. 1 depicts the functional relationships between an embodiment of a SAM 111 and the other computing elements of an exemplary computing system 114 associated with an embodiment of the invention.

Embodiments of the invention provide a method and system for establishing, maintaining, and securely allocating sessions between host computing systems and client computing systems. A Session Allocation Manager ("SAM") provides multiple connections between various client computing applications and various host computing applications and is especially adept at managing the allocation of sessions to many clients using a limited number of available sessions associated with a given host application. The SAM sessions may be named and configured individually or they may be grouped into pools of SAM sessions.

Embodiments of the SAM provide a scaleable interface with a mainframe host application. A scaleable interface is one that may be made larger or smaller with relative ease, and with a uniformly rising increase in cost to the user. For example, the SAM may be implemented as a component of a system using a client/server architecture where the server includes access to a legacy host computing system. In this embodiment of the invention, multiple clients may access a host application through the SAM residing on the server even when the host application itself has only a limited number of available sessions. According to this embodiment, the SAM controls the session between the client and the mainframe host computer as follows. First, the SAM creates a session with the mainframe host computer. Second, the SAM maintains the session with the mainframe host computer while waiting for a request from a session client, or a programming element acting on behalf of the client. Third, the SAM receives an allocation request for the session from the session client. Fourth, the SAM provides a session object to the session client, or a corresponding programming element acting on behalf of the client.

The SAM minimizes the latency involved in creating and terminating a session between client and host computing systems, and embodiments of the SAM enforce inactivity timeouts between host and client computing systems. In a multiple client environment, for example, the SAM may dedicate a particular session for a particular type of user, type of request, or type of application. The SAM also performs security functions such as matching a security level before allocating a session. Embodiments of the SAM may require a password from the client before processing any requests sent by the client.

Embodiments of the SAM are particularly useful to specialized programming elements that operate on behalf of a client application to transmit data between the client and the host application. For example, embodiments of the SAM may operate with a class of objects known as Enterprise Data Objects ("EDOs") that provide an interface between client computing systems and host computing systems. An object is a software construct that contains both data and instructions that manipulate the data. An EDO may provide an interface for a client application to a screen-based host application, a customer information control system ("CICS"), or a database host application, for example. CICS is an IBM programming environment designed to allow data transactions entered at remote computers to be processed concurrently by a mainframe host computer. Each instance of an EDO may allocate a session object from SAM to communicate with the host. An EDO typically communicates with the SAM using a specialized connection mechanism, an EDO connection object, that provides the SAM with data specifying the name of the session to allocate. In a multiple client environment, the SAM may dedicate a particular session window for a particular EDO, which may itself be called upon by multiple client applications. Exemplary embodiments of EDOs are described in U.S. patent application No. 09/302,232 (Attorney Docket No. 120066.509), "DATA OBJECT ENCAPSULATION FOR DATA TRANSMISSIONS TO LEGACY COMPUTING SYSTEMS," filed on Apr. 29, 1999, which is assigned to a common assignee and which is hereby incorporated by reference.

FIG. 1 depicts the functional relationships between an embodiment of a SAM 111 and the other computing elements of an exemplary computing system 114. The computing system 114 comprises session clients 110a–c, the SAM 111, a connection server 112, and a host application 113. In the computing system 114 shown in FIG. 1, the session client 110a communicates with the host application 113 using the SAM 111 as a conduit for data passage. The SAM 111 maintains a session with the host application 114 through the connection server 112. The SAM 111 does not itself interface directly with the host application 113 in this embodiment of the invention. The SAM 111 instead establishes a session with the connection server 112, and the connection server 112 communicates directly with the host application 113.

The Black Ruby server provided by the Attachmate Corporation is a representative connection server. Thus, a Black Ruby server may provide a suitable connection server 112 in some embodiments of the invention. Black Ruby is a communications object architecture, manufactured by the Attachmate Corporation, that provides an actual interface with host applications. The Black Ruby server, a terminal emulation product, provides all of the data stream and keystroke processing facilities and eliminates the overhead associated with providing a terminal screen graphical display. The Black Ruby server provides the session interface by utilizing a number of Black Ruby objects that work in collaboration to produce the session data from a screen-based host application. For example, the host application 113 may be a screen-based host.

The connection server 112 implements programming elements that provide direct interaction with the host application 113. The session client 110a uses a session object allocated from the SAM 111 to communicate with the host application 113. The SAM 111 may reserve a particular session exclusively for the session client 110a in some embodiments of the invention.

The SAM 111 and the connection server 112 may each exist on different computing system elements than the session client 110a and the host application 113. In one embodiment of the invention, the SAM 111 establishes a communications connection with the connection server 112 that establishes a session with the host application 113. The SAM 111 then returns a proxy for the connection server session to the session client that requested the interface with the host application 113. A proxy is a software construct that relays data between applications. For example, the SAM 111, acting as a proxy, accepts requests from the session client 110a for specific services and then acts on behalf of the session client 110a by establishing a connection for the requested service. Thus, the session client's requests appear to originate from the SAM 111 rather than from the session client 110a, for example. In other embodiments of the invention, the SAM 111 provides the session client 110a with the location of a repository containing data source definitions for host application transactions.

Figure 2:
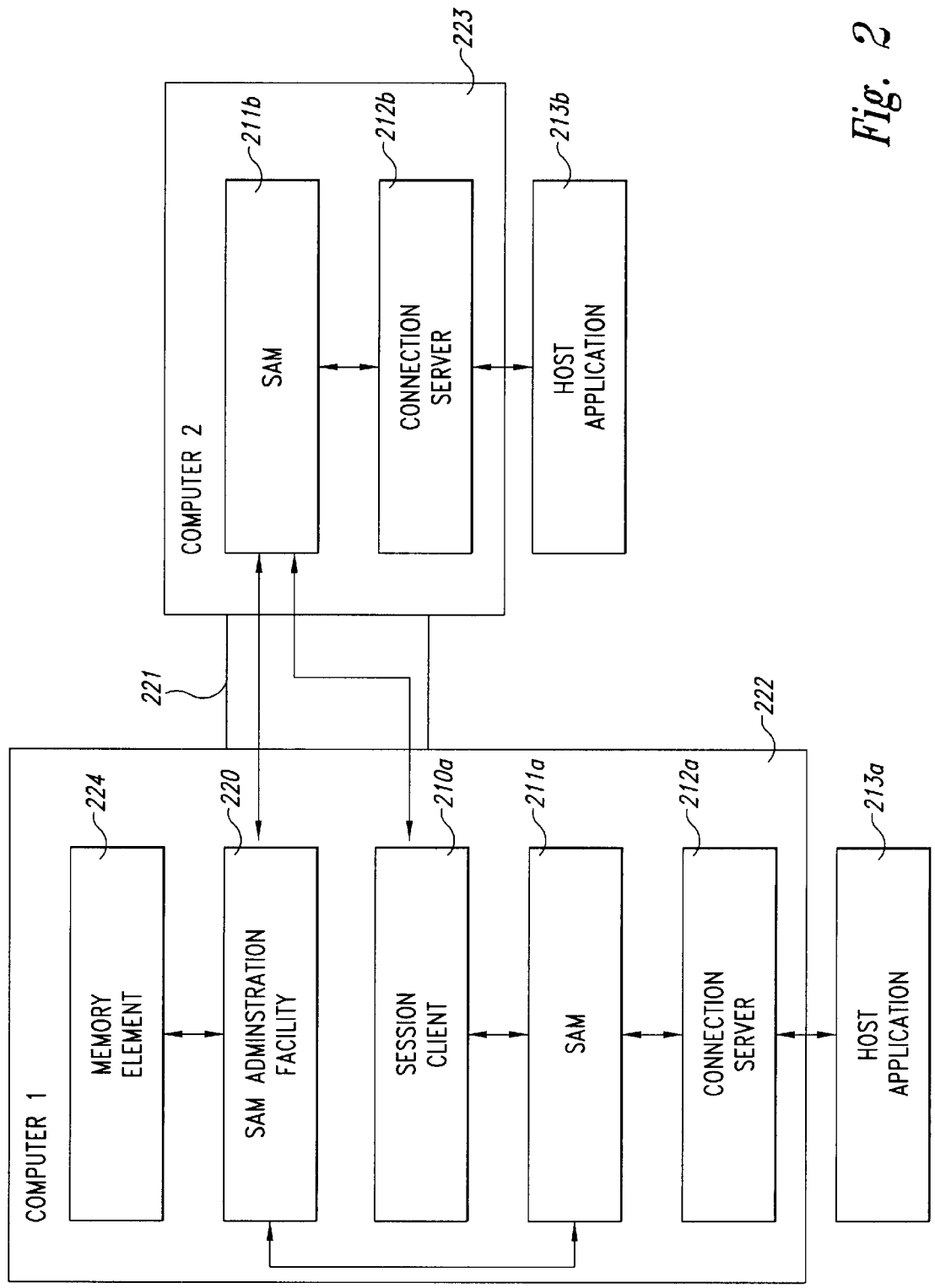
FIG. 2 illustrates a networked embodiment of the present invention such that the session client 210a is located on a first computer 222, the SAM 211b is located on a second computer 223 and a communications network 221 is used for communications between SAM and the session client.

FIG. 2 illustrates a networked embodiment of the present invention. In this networked embodiment, a session client 210a utilizes a SAM 211a in computing system 222 and a SAM 211b on a computing system 223. The SAM 211a in turn interfaces with a connection server 212a. As shown in FIG. 2, the session client 210a, the SAM 211a, and the connection server 212a all operate within the computing system 222. Over a communications network 221, the session client 210a also utilizes the SAM 211b, and a connection server 212b that communicates with another host application 213b. The SAM 211b and connection server 212b operate on a separate computer 223 from the session client's computer 222.

The SAM 211a has a SAM administration facility 220. The SAM administration facility 220 administers configurable data in the SAM 211a and the SAM211b. The configurable data includes settings for SAM session pools and SAM sessions. In other embodiments the SAM administration facility 220 may reside on another computing environment connected through a communications network to the computer on which the SAM 211a resides. Using the communications network 221, the SAM administration facility 220 can be used to administer either SAM 211a or SAM 211b.

As previously discussed, more session clients may exist than shown in FIG. 2. The session clients may collectively interface with other host applications, including both screen-based applications, CICS applications, and database applications. In addition, the various host applications 213a and 213b may operate on the same computer as the session client 210a. In this embodiment, the SAMs 211a and 211b reside on the same computer as the host application, such as the host application 213a and 213b, respectively.

The SAM 211a may allocate a session with the host application 213a to the session client 210a, providing the session client program or programming element utilizes an interface structure compatible with the SAM 211a. The SAM interface supports the allocation of sessions to multiple concurrent session clients. As shown in FIG. 1, the session clients 110a, 110b, and 110c may concurrently interact with a SAM (e.g., the SAM 111).

As previously discussed, in some embodiments a Black Ruby server, or a similar system, may serve as the connection server. Accordingly, in some embodiments of the invention, the SAM 211a itself may function as a Black Ruby component known as a Configuration Hierarchy Object ("CHO"). A Black Ruby CHO provides an interface that allows Black Ruby objects that are CHOs to serialize themselves, or save their state. As a Black Ruby CHO, the SAM's configurations may be saved and retrieved to and from a memory element 224 using the SAM administration facility 220. AtmObject is the base class for all Black Ruby objects. In an object-oriented programming environment, a base class is a class from which other classes may be derived by inheritance. Inheritance refers to the transfer of class characteristics to other classes derived from it. For example, if "fruits" is a class, then the classes "peach" and "strawberry" may be derived from the class "fruit," and the "peach" and "strawberry" classes inherit properties of the "fruit" class. The derived class (e.g., "peach") may add additional data elements and routines, redefine routines from the base class, and restrict access to some base class features.

Figure 3A:
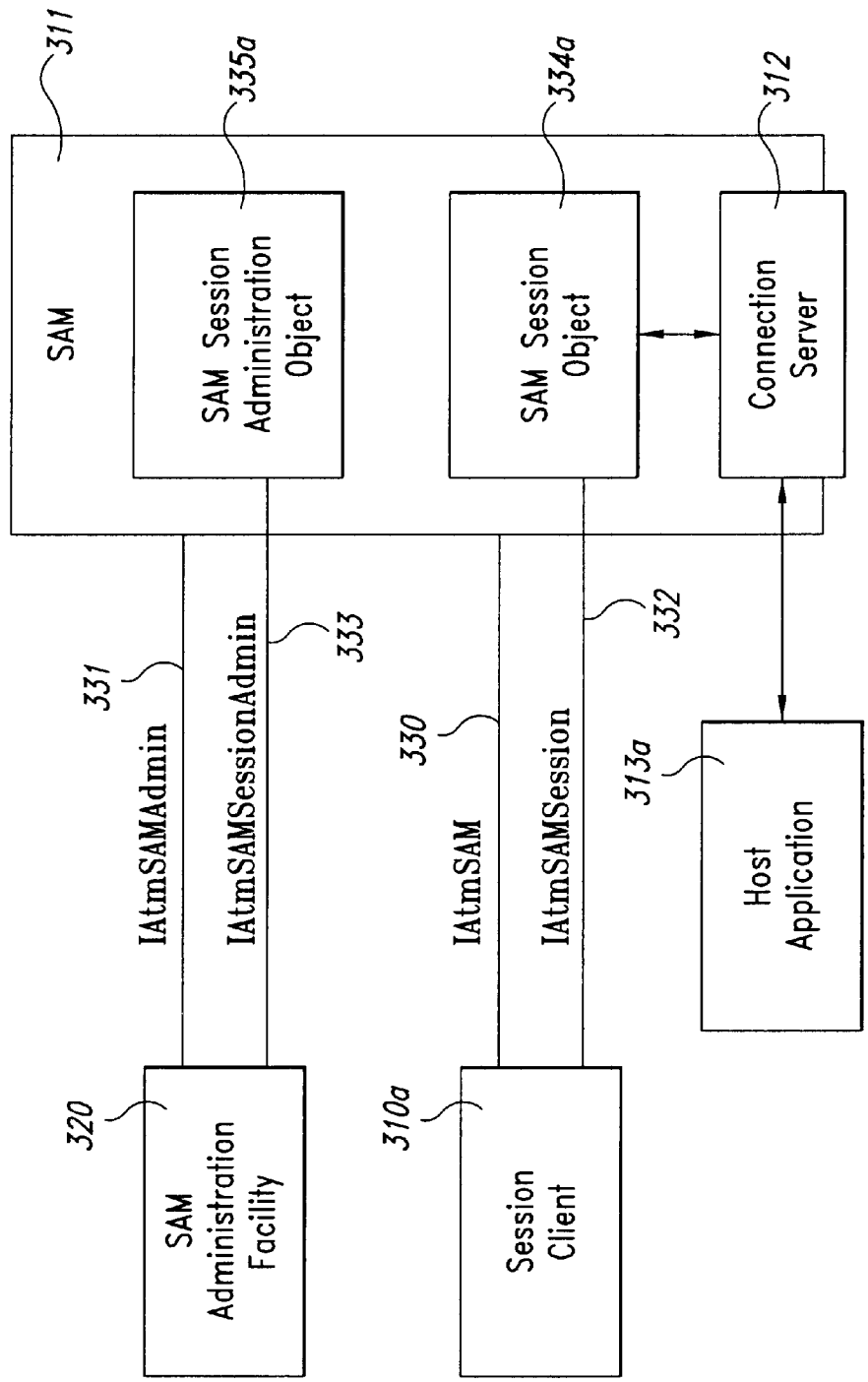
FIG. 3A illustrates an exemplary embodiment of the SAM and its object interfaces for a session with a host computer application.

FIG. 3A illustrates object interfaces provided by a SAM 311, which are used by a session client 310a and a SAM administration facility 320, according to an embodiment of the invention. The SAM 311 can be implemented with a single object interface that supports both the session client 310a and the SAM administration facility 320. In an embodiment of the invention, illustrated in FIG. 3A, the SAM 311 implements independent object interfaces. By separating the object interfaces for the session client 310a and the SAM administration facility 320 then, access restrictions can be applied separately. For example, in some embodiments, the session client 310a may access the SAM 311 to allocate a session with relative ease using Microsoft Transaction Server ("MTS") roles at the object interface level. In contrast, access to the SAM administration object interface, IAtmSAMAdmin 331, may require the highest level of security.

FIG. 3A illustrates a SAM session administration object 335a and a SAM session object 334a that are used by the SAM administration facility 320 and the session client 310a respectively. The SAM 311 may be implemented with a single object that supports both the session client 310a and the SAM administration facility 320. In an embodiment of the invention, such as that shown in FIG. 3A, the SAM 311 implements separate objects. The SAM session administration object 335a and the SAM session object 334a are separate objects so that inactivity timeouts may de-allocate the SAM administration object 335a while still leaving the session client 310a with a valid object interface.

The SAM 311 provides the SAM administration facility 320 with the IAtmSAMAdmin 331 object interface for configuring, controlling, and monitoring sessions, according to an exemplary embodiment of the invention. The SAM 311 provides the session client 310a an IAtmSAM 330 object interface for allocating sessions, according to an embodiment of the invention. The SAM administration facility 320 permits the name of a file containing a serialized SAM configuration to be specified when the SAM 311 operates as a Microsoft Windows NT service, for example. The SAM administration facility 320 also provides a mechanism for loading a serialized configuration.

In some embodiments, such as when the SAM 311 has been implemented as a Windows NT service, the SAM 311 may be configured to start whenever the computer on which it resides reboots. This embodiment of the invention provides a failure recovery mechanism that is especially helpful when the computer must be rebooted in an unattended mode.

In some embodiments, the SAM 311 is not directly visible to a user or a user application on a client machine. User applications may interface with a connection mechanism, such as an EDO, rather than with the SAM 311 directly, as discussed above. In this case the session client 310a is an EDO and the user application is a client of the EDO. In addition, the SAM 311 may provide additional restrictions on access to sessions requested by the session clients, such as session client 310a. For example, the SAM 311 may utilize MTS "roles" to restrict access to session objects, in an exemplary embodiment of the invention. An MTS role defines a class of users for a set of MTS application components. Each MTS role defines a set of users that may be denied or allowed access to resources, such as SAM session objects. The SAM 311 allows assignment of MTS roles to both individual sessions and pools of sessions, according to an exemplary embodiment of the invention.

The SAM administration facility 320 further supports the assignment of MTS roles to particular sessions, configuration of inactivity timeouts, naming conventions for sessions, and setting a path to the corresponding configuration file. The SAM administration facility 311 allows an administrator to configure the availability of specific SAM sessions and to configure session parameters. The SAM administration facility 311 also allows an administrator to control session initialization, the maximum number of connections on a particular host session, groups of client identifications, "log on" and "log off" sequences, as well as other parameters. The IAtmSAMAdmin object interface 331 may be accessed by the SAM administration facility 320 from the same computing system containing SAM 311 or from another computing system at a remote location.

FIG. 3A further illustrates exemplary object interfaces provided by an embodiment of the SAM. A SAM session object 334a implements an IAtmSAM 330 object interface that is used by a session client 310a to allocate a session from a SAM 311. The session client 310a may be a client itself or a mechanism acting on behalf of the client, such as an EDO.

The IAtmSAM 330 object interface includes an AllocateSession() method that is invoked by the session client 310a to allocate a session. In a Microsoft COM embodiment of the invention the Allocate() method returns an IDispatch object interface reference. A COM embodiment is discussed below with regard to FIG. 5.

The AllocateSession method of the IAtmSAM 330 object interface provides the session client 310a with an appropriate interface for the specific session type requested, such as a screen-based interface or a CICS-based interface. For the screen-based session client 310b associated with a screen-based host application 313b, the IAtmSAM object interface 330 provides an IAtmScreenSession 336 object interface, which will be discussed below with regard to FIG. 3B. For the CICS session client 310c associated with a CICS host application 313c, the IAtmSAM 330 object interface provides an IAtmCICSSession 338 object interface, such as will be discussed below with regard to FIG. 3C. The session client can invoke the QueryInterface() method of the IDispatch object interface to obtain a reference to either the IAtmSAMSession 332 object interface or the session type specific object interface. As discussed later for a screen-based host session, the IAtmSAMScreenSession 336 object interface may be obtained or for a CICS-based host session the IAtmCICSSession 338 object interface may be obtained by invoking the QueryInterface() method.

If the requested session must be dynamically created, or if the requested session has previously been configured for connection at allocation, then the SAM 311 connects the requested session with the host application 313a using the connection server 312. The host session establishment occurs before returning a SAM session object 334a to the session client 310a.

The session client 310a provides the IAtmSAM 330 object interface with parameters that include a session name, a session type, a timeout period and any other criteria. The LAtmSAM 330 object interface returns a reference to an IAtmSAMSession 332 object interface. In some embodiments of the invention, the reference to the IAtmSAMSession 332 object interface may be an IDispatch pointer. In those embodiments, the IAtmSAMSession 332 object interface derives from the IDispatch object interface. All "automation" objects that are expressions of Microsoft's ActiveX technology support the IDispatch object interface. IDispatch, an automation object interface, allows objects to be invoked without the invoking object needing to have a priori knowledge of the object interface. Automation objects can be invoked by scripting environments such as Microsoft's ActiveX server, VBScript, and JScript. In this embodiment, the method invoked on the IAtmSAM 330 object interface to allocate a session returns a reference to an IDispatch object interface.

The session name identifies a specific SAM session object or a class of SAM session object being requested by the session client 310a. In an embodiment of the invention, the session name may be the name of an individual SAM session object configured by the SAM 311, the name of a session pool in the SAM's pool collection, the path and file name or moniker for a specific file. The item specified by the session name, a configured session, pool, or file, either references or contains a data source definition. The data source definition contains the parameters for exchanging data between the session client 310a and the host application 313a. The data source definition includes screen navigation information for a screen-based host application, and a transaction repository for a CICS-based host application.

The session type represents a specific SAM session object interface type, such as a screen-based interface or a CICS-based interface. The LAtmSAM 330 object interface returns an "Ok" if a SAM session object has been successfully allocated to the session client 310a or an indication of failure if the SAM session object could not be allocated. Failure to allocate a SAM session object may arise because the session name provided by the session client 310a either did not match any of the configured sessions, did not match any of the configured pools or did not correspond to the path and file name of a data source definition. A SAM session allocation may also fail because all of the available SAM sessions have been fully allocated, because the session is in an error state or because the session client does not have the required security authorization. The SAM configuration parameters provide additional control over the allocation of SAM session objects and the access of clients to host sessions.

The SAM administration facility 320 may use the IAtmSAMAdmin 331 object interface to obtain add, modify or delete a SAM session or a SAM pool. The IAtmSAMAdmin 331 object interface allows the SAM administration facility 320 to enumerate, add, and remove sessions directly. The IAtmSAMAdmin 331 object interface also provides information on the current state of the SAM 311. The IAtmSAMAdmin 331 object interface further provides a means for controlling and monitoring the SAM's background session processing. The background session processing provides time-out monitoring and error recovery. The IAtmSAMAdmin 331 object interface may include methods or properties for adding a SAM session to a SAM pool. The SAM administration facility 320 may configure a session to allow one or more concurrent session object allocations to the session client 310a. Each allowed session allocation establishes a connection to the host application 313a, according to an embodiment of the invention. The SAM 311 maintains a separate inactivity timeout for each session allocation. If the inactivity timeout for an allocation expires, the SAM 311 may reclaim the session and allocate it to another client. Subsequent requests from the original client will then result in an inactivity error message.

Both SAM's terminal session interfaces and SAM's CICS session interfaces perform background session processing. Although background session processing is primarily intended for a terminal session interface, methods for performing background processing are available on both the terminal session and CICS session. For both screen-based and CICS sessions, the background processing implements inactivity timeouts. For the terminal sessions, the background processing connects the sessions if they are configured to remain connected. Background processing also performs any configured "log on" sequence after the session is connected and any "log off" sequence before the session is disconnected.

The SAM administration facility 320 may use the IAtmSAMAdmin 331 object interface to obtain the SAM session and the SAM pool collections. The IAtmSAMAdmin 331 object interface allows the SAM Administration utility to enumerate, add, and remove sessions directly. The IAtmSAMAdmin 331 object interface also provides information on the current state of the SAM 202. The IAtmSAMAdmin 331 object interface further controls and monitors the SAM background session processing. The IAtmSAMAdmin 331 object interface includes methods for creating a SAM session, creating a session pool, and returning a reference to an object that supports an IAtmSessionAdmin 333 object interface which will be discussed below.

In an embodiment of the invention, each SAM session consists of two objects. One object is a SAM session administration object 335a, and the second object is a SAM session object 334a. A SAM session administration object 335a is created when the SAM administration facility 320 creates a new session or when a SAM session is created dynamically by a session client 310a. The SAM session administration object 335a creates a SAM session object 334a when the SAM session is allocated. The SAM session object 334a is released when the session client 310a deallocates the session.

In an embodiment, the SAM 311 maintains a separate inactivity timeout for each session allocation. Alternatively, a global inactivity timeout could be used for all sessions. If the inactivity timeout for an allocation expires, the SAM 311 may automatically deallocate the SAM session from the first session client and allocate it to another session client. Subsequent requests from the original client will fail, reporting an inactivity error. The SAM 311 may impose a limit on the number of concurrent session allocations or allow unlimited concurrent allocations.

Figure 3B:
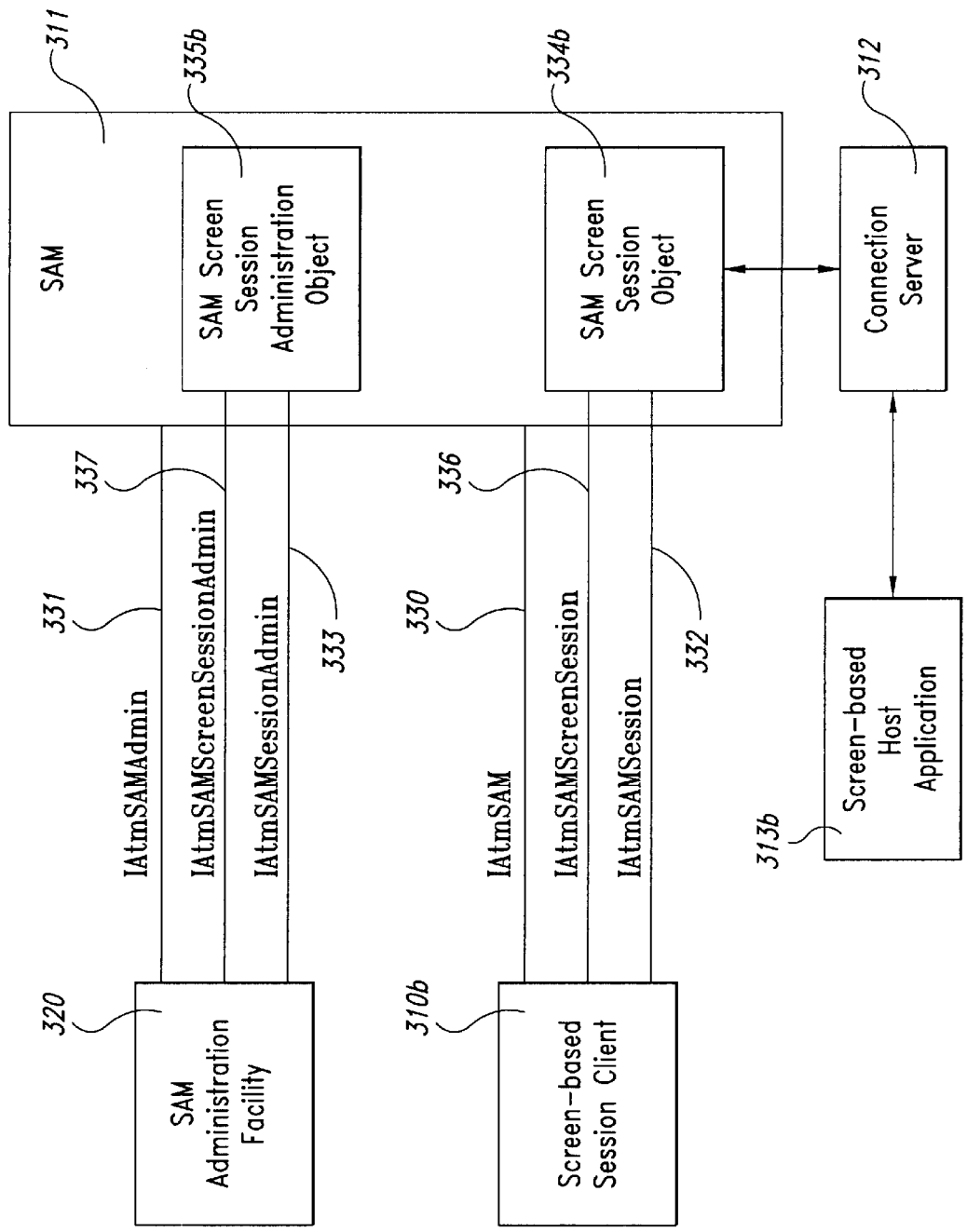
FIG. 3B illustrates an exemplary embodiment of the SAM and its object interfaces for a session with a screen-based host computer application.
Figure 3C:
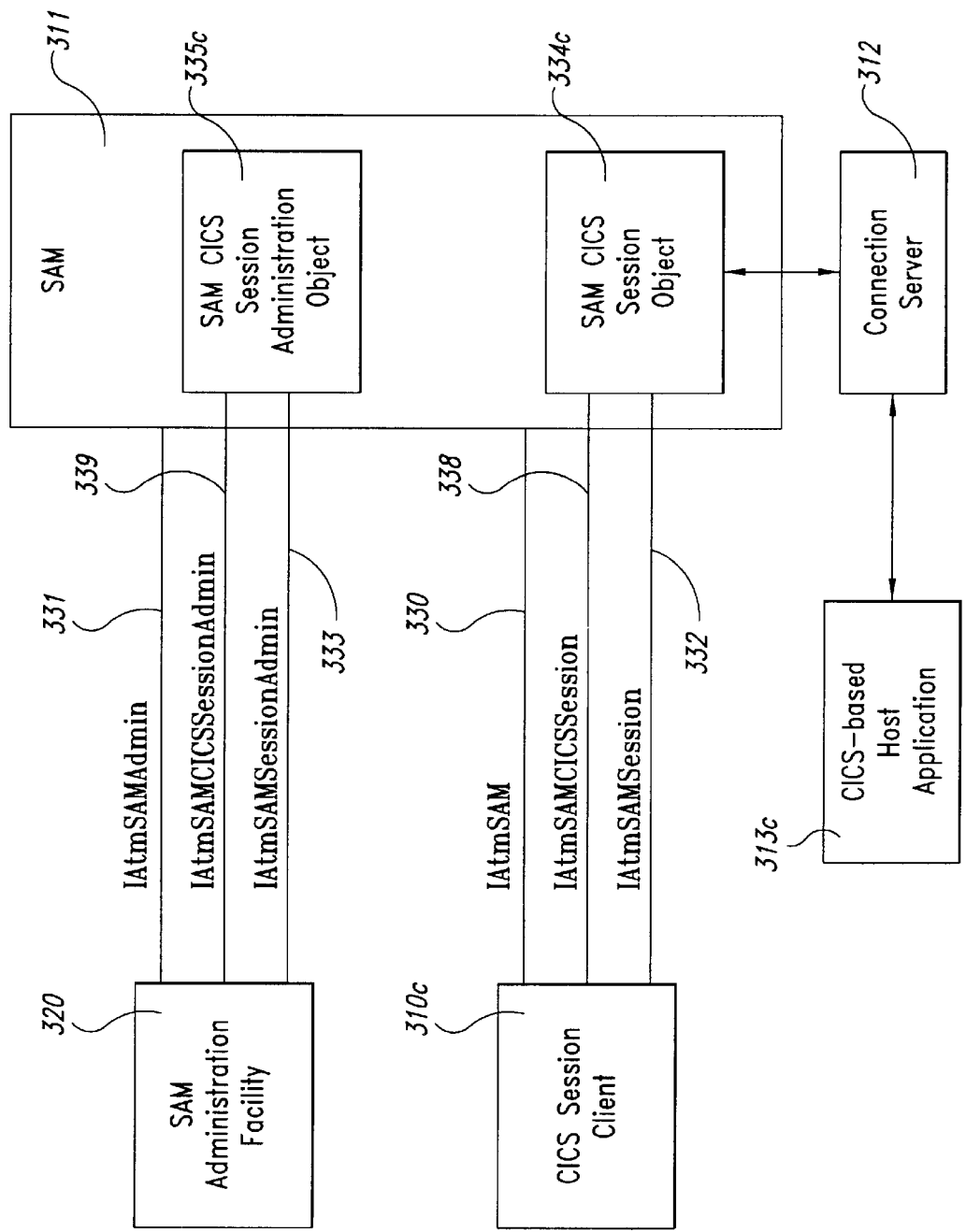
FIG. 3C illustrates an exemplary embodiment of the SAM and its object interfaces for a session with a CICS-based host computer application.

The IAtmSessionAdmin 333 object interface is the base object interface from which specific SAM session administration object interfaces are derived. FIGS. 3B and 3C illustrate exemplary embodiments of the specific object interfaces for screen-based and CICS-based host applications respectively. An IAtmScreenSessionAdmin 337 object interface and an IAtmCICSSessionAdmin 339 object interface both derive from the IAtmSessionAdmin 333 object interface. These session administration interfaces configure the SAM 311 screen-based and CICS-based host sessions respectively.

The derived session administration object interfaces have properties and methods specific to the type of host session they support. For example, the IAtmScreenSessionAdmin 337 object interface may have properties that specify the host connectivity parameters, the navigation data source definition, and connection timeouts. The IAtmSAMCICSSessionAdmin 339 object interface may have properties that specify transaction parameters. As previously mentioned, in object-oriented programming, a parent class is referred to as the "base" class, and a child class is referred to as the "derived" class. In this case derived object interfaces provide properties and methods specific to the transaction type and the host connectivity.

The IAtmSAMSessionAdmin 333 object interface includes an Allocate() method that allocates the session and returns a reference to an object that implements the SAM session object interface IAtmSAMSession 507, as previously discussed.

The IAtmSAMSessionAdmin 333 object interface includes a Create() method that creates an instance of the connection server 312. The IAtmSAMSessionAdmin 333 object interface includes a Deallocate() method that makes the session available for other clients to use, e.g., available for allocation by other session clients. The IAtmSAMSessionAdmin 333 object interface includes a Destroy() method that destroys the instance of the connection server 312 created by the Create() method. The IAtmSAMSessionAdmin 333 object interface further includes a read/write property named "LastResult" that sets or retrieves the result of the last operation performed by the SAM 311 on the connection server 312. The SAM 311 typically updates the LastResult property only for operations that it performs, such as creating, connecting, or the sequences for logging on or logging off.

The IAtmSAMSessionAdmin 333 object interface includes a Process() method that performs background processing for the session. For example, the Process() method may create a create connection server 312 if the SAM session administration object 335a is configured to automatically create a connection server when SAM starts executing. If the SAM session administration object 335a is configured to remain connected but becomes disconnected (for any reason), the Process() method re-establishes the host session. The Process() method also executes the "log on" sequence if one is configured and the session is configured for remaining connected.

The IAtmSAMSessionAdmin 333 object interface includes a read/write property named "AllocatedInactivityTimeout". This property configures a time limit on the duration that the session client may keep a session allocated without using the session. If so configured, the session will be deallocated if no activity occurs within the configured inactivity timeout period. If the timeout arises, then the SAM session object reference held by the session client is still valid but the methods invoked by the session client will be return with an error result, e.g., ATM_E_TIMED_OUT.

The IAtmSAMSessionAdmin 333 object interface includes a read/write property named "ConfigurationPath" that sets or retrieves the string that specifies the location of the configuration associated with the session. The IAtmSAMSessionAdmin 333 object interface includes a read only property named "State" that retrieves the present state of the session. The IAtmSAMSessionAdmin 333 object interface includes a read/write property named "ConnectTimeout." This property configures a time limit on the duration that SAM will wait for a host connection to establish.

FIGS. 3B and 3C illustrate exemplary embodiments of SAM session administration objects and SAM session objects for screen-based and CICS-based systems respectively. For each type of host connectivity supported a session an object interface specific to the type is derived from the IAtmSAMSession 332 object interface. Also, an object interface specific to the type is derived from the IAtmSAMSessionAdmin 333 object interface. The specific object interface derived from the IAtmSAMSession 332 object interface is returned to the session client 310a when the session is allocated. Similarly, the specific object interface derived from the IAtmSAMSessionAdmin 333 object interface is used by the SAM administration facility 320 to administer specific session types.

FIG. 3B illustrates an exemplary SAM session administration object 320 and SAM session object for use with a screen-based host application 313b. The SAM screen session object 334b implements the IAtmSAMScreenSession 336 object interface. The IAtmSAMScreenSession 336 object interface includes a Navigate() method that provides the screen-based session client 310b with indirect access to a target screen on a screen-based host application 313b. The Navigate() method's parameters include input data necessary for navigation to the target screen. The input data includes information required on the intermediary screens traversed while navigating to a target screen. Other Navigate() method parameters may include the names of specific paths to be taken during the navigation process. These specific path names, when provided, override the default settings of a navigation engine that otherwise computes a least cost route between a start screen and a target screen. Additional Navigate() method parameters include objects for collecting output data received during the navigation process. When these parameters have been provided, then the Navigate() method collects data from the specified fields as the navigation transitions through the intermediary screens along the path to the target screen.

FIG. 3C illustrates an exemplary SAM 311 for use between a CICS-based host application 313c and a CICS session client 310c. FIG. 3C illustrates an exemplary SAM CICS session administration object 335c and SAM CICS session object 334c for use with a CICS-based host application 313c. The SAM CICS session object 334c implements the IAtmSAMCICSSession 338 object interface. The IAtmSAMCICSSession 338 object interface derives. from the IAtmSAMSession 332 object interface and contains methods and properties required in order for the CICS session client 310c to perform CICS transactions.

The IAtmSAMCICSSession 338 object interface includes a Transact() method that provides the CICS session client 310c with indirect access to a CICS transaction on a CICS-based host application 313c. The Transact() method's parameters include input data necessary for the transaction. Additional Transact() method parameters return output data from the transaction.

Figure 4:
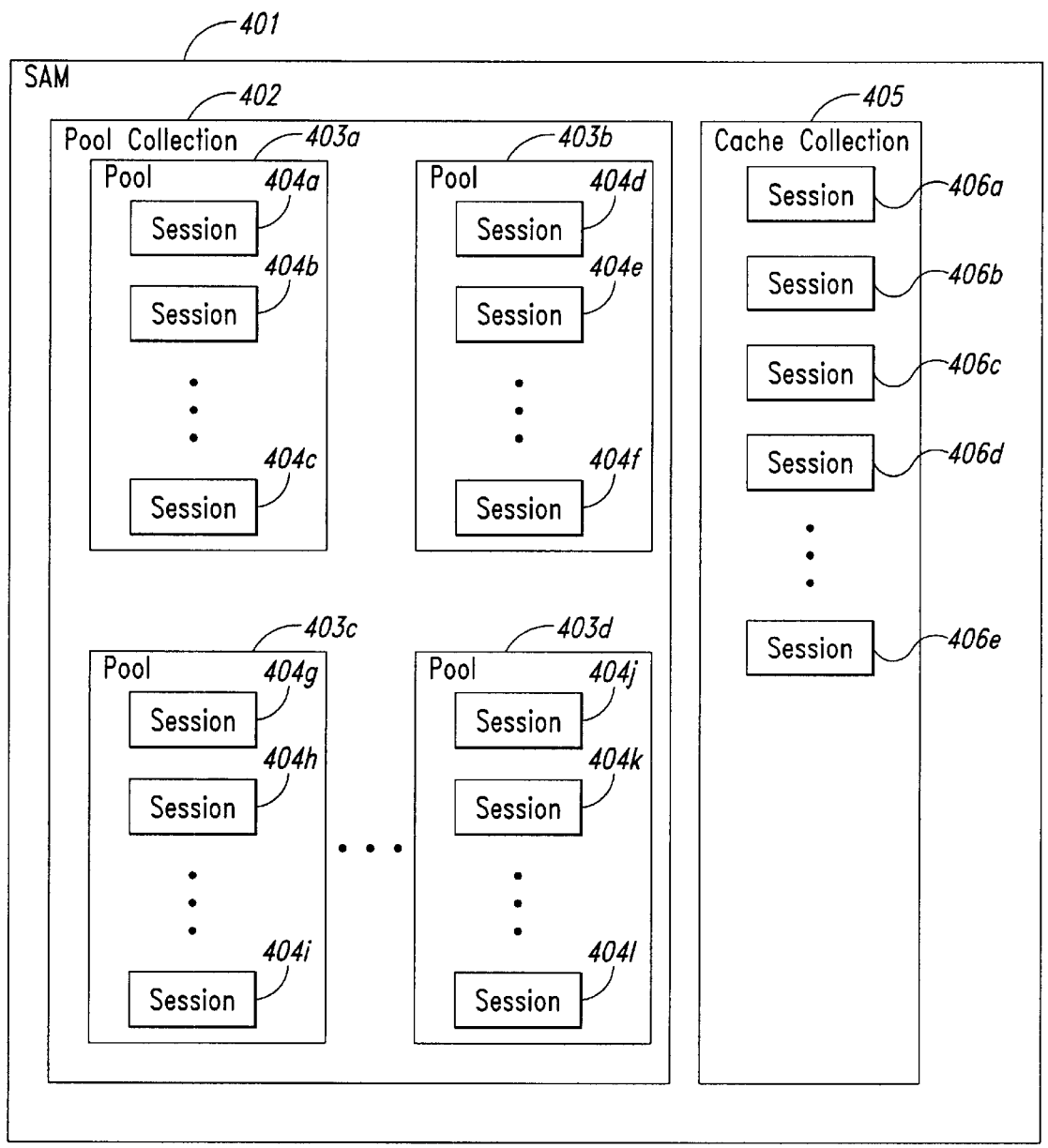
FIG. 4 illustrates an exemplary SAM session pool collection 402 and a SAM cache collection 405 in a SAM 401.

FIG. 4 illustrates an exemplary SAM pool collection 402 and a cache collection 405 in a SAM 401. The SAM pool collection 402 contains pools 403a–403d. The SAM 401 imposes no limit on the number of pools in the SAM pool collection 402. Each SAM pool 403a–403d may contain an unlimited number of SAM sessions. For example, the pool 403a contains sessions 404a–404c but may contain even more sessions as indicated by the ellipse between the session 404b and the session 404c.

The SAM pool collection 402 communicates with an object collection object interface, e.g., IAtmObjectCollection object interface. The SAM pool collection 402 also maintains an interface with a host object interface and a persistence object interface. A host object interface is an interface between a SAM and a host, such as the host application 313a. The SAM 401 may also need to save session configurations and other parameters in memory for later use. A persistence interface allows the SAM to save configurations and other parameters in memory.

The SAM pool collection 402 contains SAM sessions. The SAM 401 allocates SAM sessions contained in a SAM pool on a first-come-first-served ("FIFO") basis. As previously discussed, embodiments of the SAM may utilize MTS "roles" to restrict access to session windows. An MTS role defines a class of users for a set of MTS application components. Each MTS role defines a set of users that may invoke object interfaces to a given MTS component. MTS roles may be assigned to each named SAM pool 403a–403d and to each session 404a–4041 in the SAM pool collection 402. Thus, one or more sessions in a SAM pool, such as the SAM pool 403a, may be reserved for priority use.

A client application will only be allocated a session from a SAM pool, such as the SAM pool 403a, if the client's MTS role allows the client access to both the pool and to an available session, such as the session 404c, in the SAM pool. If the SAM pool has no assigned MTS role, then any client may allocate a session from the SAM pool if the client's MTS role allows the client to access an available session in the SAM pool. If the client's MTS role allows access to the SAM pool and to a session in the SAM pool, then the client will be allocated the session. If MTS is not installed, then all the requests win be honored, as previously discussed.

The SAM 401 contains a maximum sessions parameter that specifies the maximum number of the sessions 404a–404l that may be allocated concurrently. Additional sessions may be configured in pools, such as the pool 403d, or individually beyond the maximum allocation for concurrent sessions. The maximum sessions parameter may restrict the load on the host connection element, such as the Black Ruby server, to a maximum level, according to an embodiment of the invention.

If a client requests a session and the name specified in the client's request does not match any of the individual sessions or the session pools, then the SAM 401 assumes that the client-provided name refers to a terminal session configuration (screen-based host) or a transaction repository file (CICS-based host). The SAM 401 then attempts to create a terminal session of the specified type and return a session window to the client.

The SAM 401 includes a Remove_All_Pools() method that removes and releases all of the SAM pools 403a–403d in SAM's pool collection 402. The Remove_All_Pools() method also releases and de-allocates all of the sessions 404a–404l in the pools 403a–403d.

To minimize terminal session latency, the SAM 401 caches host sessions in a cache collection 405 so that it will not need to perform a connection sequence each time a client allocates the session. The cache collection 405 refers to a special memory subsystem in which frequently used data items, such as the SAM's sessions, are duplicated for quick access. The cache collection 405 may contain an unlimited number of sessions 406a–406e. The SAM 401 dynamically populates the cache collection 405 at discrete intervals based on the demand for client connections. The sessions 406a–406e may be individually configured for removal from the cache collection 405 after a predetermined period of non-use or a session may remain in the cache collection 405 until explicitly removed by a SAM administration facility, such as the SAM administration facility 320 shown in FIG. 3.

The SAM 401 may configure a subset of the sessions 406a–406e to remain connected continuously in order to populate the cache collection 405 statically. The sessions 406a–406e that are statically cached perform their "log on" sequence with the host mainframe computer during the initialization period. When the sessions 406a–406e are dynamically caches, they perform their "log on" sequence when the first client allocates one of the sessions 406a–406e. The "log off" sequence is performed when the SAM 401 terminates and when the cache collection 405 de-allocates a session. The "log on" sequence is performed after the "log off" sequence when the session is de-allocated.

Figure 5:
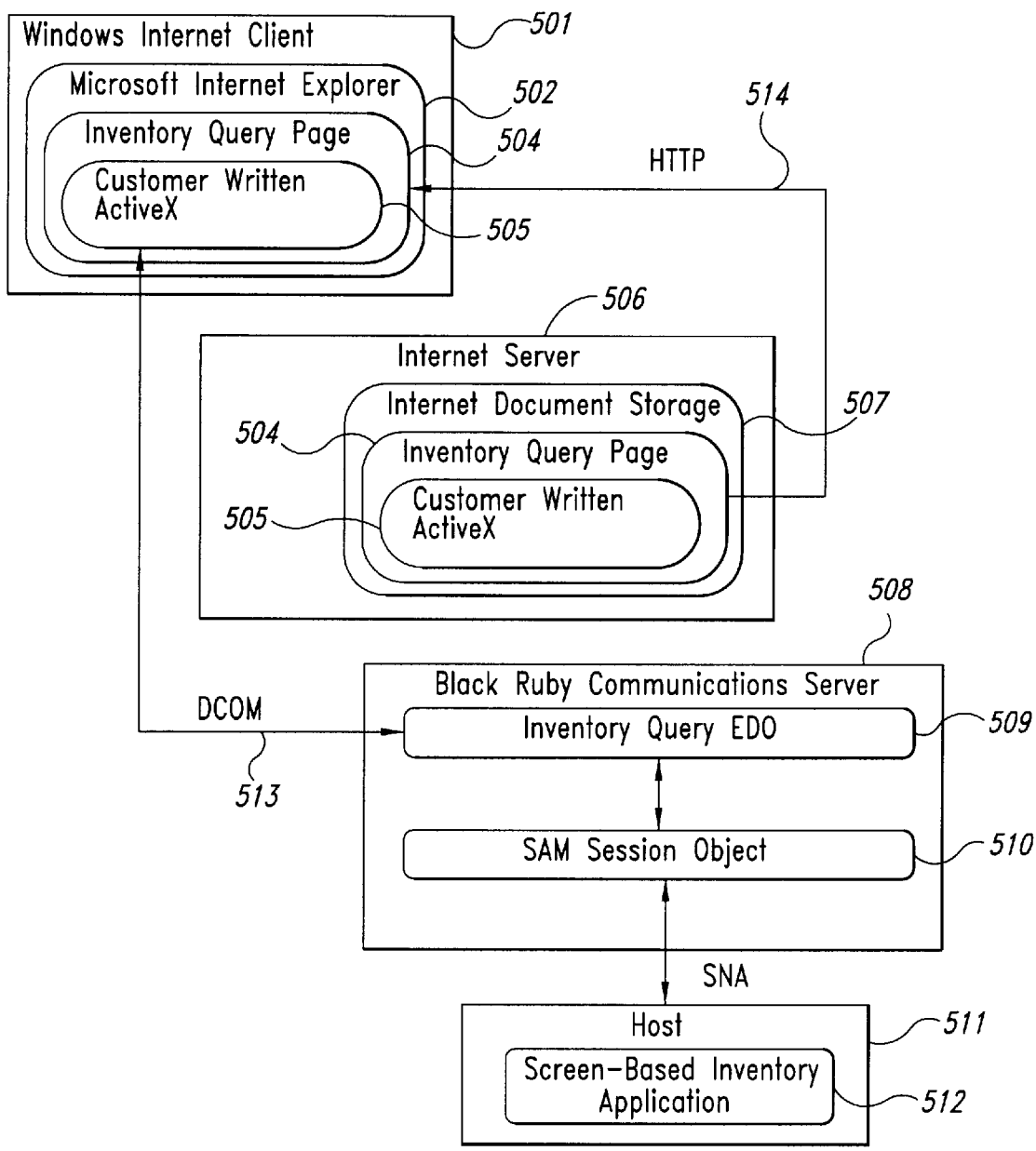
FIG. 5 provides an exemplary embodiment of the SAM operating in conjunction with an EDO associated with an Internet application.

FIG. 5 provides an exemplary embodiment of the SAM operating in conjunction with an EDO associated with an Internet application. A Windows Internet client 501 utilizes a Microsoft Internet Explorer program 502 to send a request over a Hypertext Transfer Protocol ("HTTP") connection 514 to an Internet server 506 in order to access an Internet document storage medium 507. The Internet document storage medium 507 contains an Inventory Query Page 504 that includes a Customer-Written ActiveX control 505. The Customer-Written ActiveX control 505 accesses an Inventory Query EDO 509 on a Black Ruby communications server 508 over a Distributed Component Object Module ("DCOM") connection 513. EDOs may utilize protocols such as the Component Object Model ("COM") and DCOM, also known as OLE or ActiveX. COM provides a specification for building software components that can be assembled into programs or add functionality to existing programs running on Microsoft Windows platforms. DCOM stipulates how COM components communicate over Windows-based networks. DCOM permits the distribution of different portions of a single computer program across two or more networked computers. Using DCOM, the computer program's distribution across a network is not apparent to the user.

The Black Ruby communications server 508 also includes a SAM session object 510. The SAM session object 510 interfaces with a host computing system 511 that includes a legacy screen-based inventory application 512. In this embodiment of the invention, the SAM session object 510 utilizes IBM's Systems Network Architecture ("SNA") to interact with the host computing system 511 having the screen-based inventory application 512.

The Black Ruby communications server 508 is a piece of a communications object architecture developed and maintained by the Attachmate Corporation, as previously discussed. The Black Ruby communications server 508 coordinates with the SAM session object 510 to provide a complete interface with the screen-based inventory application 512. The Black Ruby communications server 508 may facilitate the session interface by utilizing a number of Black Ruby objects that work in collaboration with the SAM session object 510 to produce the session data. While this exemplary embodiment of the invention has been discussed in terms of the Black Ruby communications server 508 and the SAM session object 510, the present invention is not limited to use only with the Black Ruby communications server 508 and may be used with any combination of elements that provide an interface with a host computing application such as has been discussed.

EDOs support DCOM and CORBA distributed object interfaces. These interfaces provide programmers with considerable latitude in the deployment of EDO-based solutions. A customer-written application, such as the Customer-Written ActiveX window 505, may be run on the same computer as the SAM session object 510. Alternatively, the customer-written application may be run on a client computer that accesses a server containing the EDOs. Thus, the distribution of EDOs between a client and a server may be optimized by the programmer for a particular environment. In other words, some EDOs may be run on the client while others may be run on the server, depending on the particular requirements of the systems deployed.

Figure 6:
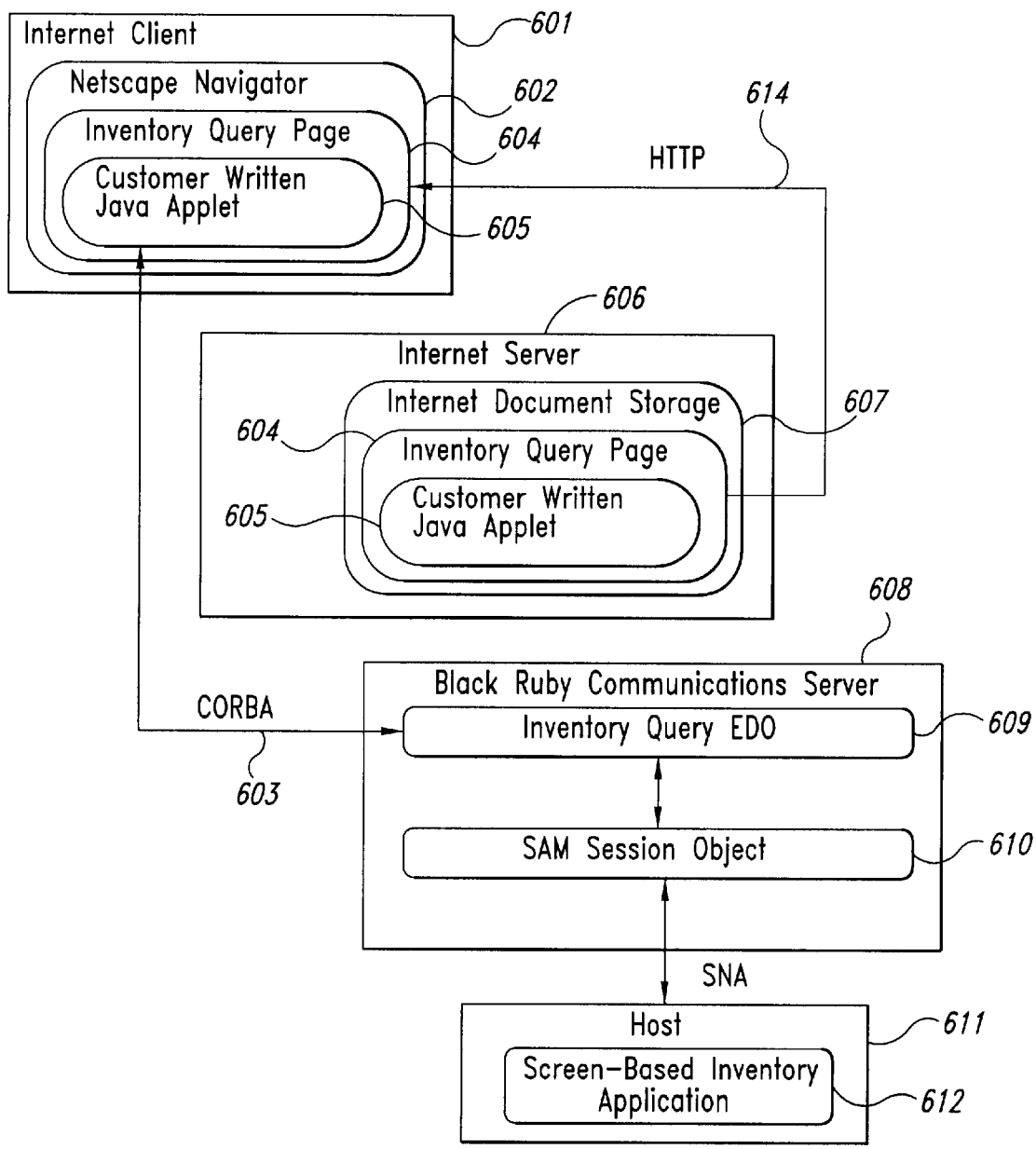
FIG. 6 illustrates an exemplary embodiment of the SAM operating in conjunction with an EDO deployed in an Internet Netscape environment.

FIG. 6 illustrates an exemplary embodiment of the SAM operating in conjunction with an EDO deployed in an Internet Netscape environment. An Internet client 601 utilizes a Netscape Navigator program 602 to access the Internet server 506 having the Internet document storage medium 507. The Internet document storage medium 507 accesses the Inventory Query Page 504 having a Customer-Written Java Applet window 605. The Internet server 506 uses the HTTP connection 514 to provide the Inventory Query Page 504 and the Customer-Written Java Applet window 605 to the Netscape Navigator program 602. In this embodiment of the invention, the Customer-Written Java Applet window 605 utilizes the Common Object Request Broker Architecture ("CORBA") 603 to communicate with the Black Ruby communications server 508. CORBA, used by IBM, Sun and Apple among others, allows objects from one program to communicate with objects in other programs even if the two programs are written in different programming languages and running on different computing platforms. A program requests objects through an object request broker ("ORB") and does not need to understand the structure of the program containing the object. The Customer-Written Java Applet window 605 may utilize other systems and protocols for communicating with the Black Ruby communications server 508, such an Internet Inter-ORB protocol ("IIOP") connection.

The Black Ruby communications server 508 includes the Inventory Query EDO 509 that interfaces with the SAM session object 510. In this embodiment of the invention, the SAM session object 510 utilizes SNA to interact with the host computing system 511 host having the screen-based inventory application 512.

The EDO system shown in FIG. 6 operates as follows for an inventory application exemplary. The Netscape Navigator program 602 sends a request through the Inventory Query Page 504, a Hypertext Markup Language ("HTML") page, using the HTTP connection 514 that retrieves the Customer-Written Java Applet window 605 from the Internet server 506. The user interface of the Customer-Written Java Applet window 605 prompts the Netscape Navigator user for a part number. Using CORBA requests to the Inventory Query EDO 509 associated with the Black Ruby communications server 608, the Customer-Written Java Applet 505 requests inventory information for the part number of interest to the user. The Inventory Query EDO 509 may even be a compound EDO that uses a simple description EDO, a simple quantity EDO, and simple price EDO to gather information about the requested part. These EDOs in turn use the Navigate method of the IAtmSAM-ScreenSession 336 object interface of the SAM screen session object 334b to navigate to the inventory system using one or more SAM session objects 510. The navigation provided by the SAM session object 510 locates the user-requested information within the screen-based inventory application 512 on the host computing system 511 and reaches the particular screen containing the user-requested information.

While the present invention has been described with reference to preferred embodiments thereof, those skilled in the art will appreciate that various changes in form and detail may be made without departing from the intended scope of the present invention as defined in the appended claims. For example, the structure of the SAMs may differ from those shown in the drawings. The SAMs' actual communications connections with objects, such as the EDOs and the server, such as the Black Ruby server, may differ from the functional description described above.

While the preferred embodiment has been described in terms of object-oriented programming, the embodiments of the invention may be encoded in any programming paradigm. Embodiments of the invention may be encoded in any programming language, and the invention is not limited to any particular type of programming language. In addition, the invention is not limited to communication only with EDOs but may communicate with any similarly functioning element, including application programs that have been configured to generate communications similar to those described herein for EDOs.

Although specific embodiments of, and examples for, the invention are described herein for illustrative purposes, various equivalent modifications are possible within the scope of the invention, as will be recognized by those skilled in the relevant art. The teachings provided herein of the invention can be applied to other legacy and enterprise computing systems, not just the exemplary legacy systems described above. Various exemplary computing systems, and accordingly various other system configurations can be employed under other embodiments of the invention. The embodiments of the invention disclosed herein have been discussed with regard to computerized network installations, such as those using large centralized computing systems. However, the invention finds equal applicability in other computing systems, such as small, portable computerized systems and even hand-held computing devices. The invention also finds applicability in a network of telecommunications devices that both send and receive voice and data communications. Moreover, various aspects of the invention may even be comprised of micro-code provided in various pieces of hardware equipment, provided that the collective operation of the system functions in the general manner that has been described.

In general, in the following claims, the terms used should not be construed to limit the invention to the specific embodiments disclosed in the specification and the claims, but should be construed to include all session allocation managers that operate in accordance with the claims. Accordingly, the invention is not limited by the disclosure, but instead its scope is determined by the following claims.

What is claimed is:

1. A system for managing multiple connections between a plurality of clients and a host, comprising:

a receiver that receives a connection request from a requesting client of the plurality of clients for a session with the host, wherein a session contains directions for managing data communications between the requesting client and the host;

a session locator that locates the session from a collection of sessions;

a host locator that locates the host from a collection of hosts, and associates the host with the session; and a session allocator that allocates the session to the requesting client.

2. The system recited in claim 1, further comprising:

a data transmission manager associated with each session in the collection of sessions; and a data transporter that passes data between the requesting client and the host as directed by the data transmission manager.

3. The system recited in claim 1 wherein the host locator creates a communications link to the host.

4. The system of claim 1, further comprising:

a host configuration updater that receives host configuration update data and associates the host configuration update data with the host, wherein the configuration request contains configuration parameters for the session and for each connection request from the requesting client, the host locator determines if host configuration update data has been received for the host and, if so, replaces at least a portion of the configuration parameters received in the connection request with the host configuration update data.

5. The system of claim 1 wherein the host locator creates a communication link to the host before receiving the connection request from the requesting client.

6. The system claim 1 wherein the connection request has a format of a connection object of a data structure that provides data communication between clients and hosts and wherein the session utilizes the format for data communications between the requesting client and the host.

7. The system of claim 1, further comprising a configuration receiver that receives configuration parameters that include a password for accessing the host.

8. The system of claim 1 wherein the host is a screen-based computer application and wherein the session allocator invokes a data transfer procedure for passing data from the requesting client to the host in a screen based format and invokes another data transfer procedure for passing data from the host to the requesting client in a format of the requesting client.

9. The system of claim 1 wherein the host is a screen-based application having at least one target screen that receives data, further comprising a configuration receiver that receives configuration parameters specifying the at least one target screen in the screen-based application and specifying a path for reaching the at least one target screen.

10. The system claim 1 wherein the host is a customer information control system ("CICS"), and wherein the session allocator invokes a data transfer procedure for passing data from the requesting client to the host in a CICS format and invokes another data transfer procedure for passing data from the host to the requesting client in a format of the requesting client.

11. The system of claim 1 wherein the host is a customer information control system ("CICS"), and wherein the session allocator invokes a data transfer procedure that passes data from the requesting client to the host by mapping a transaction repository name received from a session direction to a CICS transaction repository file.

12. The system of claim 1 wherein the session allocator monitors data passing between the host and requesting client and de-allocates the session from the requesting client if no data passes between the host and requesting client during a predetermined time period.

13. The system of claim 1 wherein the session allocator limits the data transmissions of the requesting client with the host to data transmissions specified by configuration parameters previously received by the session allocator.

14. The system of claim 1 wherein the session allocator disassociates the host and the session upon receipt of a disconnection request.

15. The system of claim 1 wherein the session allocator sends an error message to the client if the session cannot be allocated to the requesting client.

16. The system of claim 1, further comprising:
a data repository that contains the collection of sessions and the collection of hosts, wherein the session allocator restores connections between the host and the session utilizing information in the data repository if the connection is terminated inadvertently.

17. The system claim 1 wherein the session allocator serializes data passage between the session and the client to a linear stream.

18. The system of claim 1 wherein the session allocator pools more than one session from the collection of sessions together to form a pool session having a session name, and wherein a connection request having the session name for the pool session invokes allocation of a session within the pool session to the requesting client.

19. The system of claim 18 wherein the session allocated by the session allocator from the pool session is selected on a first-in-first-out (FIFO) basis.

20. The system of claim 18 wherein the session allocator reserves a session within the pool session for priority use.

21. The system of claim 1 wherein if the session locator cannot locate the session from the collection of sessions, then the session locator creates a session according to the connection request.

22. The system of claim 1 wherein the host locator performs a logon sequence with the host.

23. The system of claim 1 wherein the host locator performs a logoff sequence with the host after receiving a disconnection request from the requesting client.

24. The system of claim 1 wherein if the receiver receives multiple connection requests for the host, then the session allocator dedicates the session to the host.

25. A method for managing multiple connections between clients and hosts, comprising:
for each client connection request:
receiving a connection request that includes a host name, a session name, and configuration parameters that include access procedures for sending and receiving data between the host and the client;
matching the session name with a name in a collection of session names;
accessing a session having the matching name from the collection of session names;
locating a host matching the host name from a collection of host names;
connecting the matching host to the accessed session;
allocating the accessed session to the client; and
passing data between the client and the matching host through the accessed session, wherein data passage is managed by the accessed session using the configuration parameters.

26. The method of claim 25, further comprising:
receiving host configuration update data for a specified host and associating the host configuration update data with a corresponding host in the collection of host names; and
for each client connection request:
determining if host configuration update data has been received for the matching host; and
replacing at least a portion of the configuration parameters received in the connection request with the host configuration update data if host configuration update data has been received for the matching host.

27. The method of claim 25 wherein the matching host is connected to the accessed session before receiving the client connection request.

28. The method of claim 25 wherein the client connection request has a format of a connection object of a data structure that establishes data communications between clients and hosts, and wherein the session utilizes the format for data communication between the matching host and the client.

29. The method of claim 25 wherein the configuration parameters include passwords for accessing the matching host.

30. The method of claim 25 wherein the matching host is a screen-based computer application and wherein passing data from the client to the matching host entails formatting data suitable for transmission to a screen based computer program, and wherein passing data from the matching host to the client entails formatting data from a screen-based format into a format of the client.

31. The method of claim 25 wherein the matching host is a screen-based application having at least one target screen that receives data and wherein the configuration parameters specify the at least one target screen in the screen-based application and specify a path for reaching the target screen.

32. The method of claim 25 wherein the matching host is a customer information control system ("CICS") and wherein passing data from the client to the matching host includes formatting data into a CICS format, and wherein passing data from the matching host to the client entails formatting data from a CICS format into a format of the client.

33. The method of claim 25 wherein the matching host is a customer information control system ("CICS"), and wherein passing data from the client to the matching host entails mapping a transaction repository name in the configuration parameters to a CICS transaction repository file.

34. The method of claim 25 wherein the accessed session monitors the data passing between the matching host and the client and deallocates the accessed session from the client if no data passes between the matching host and the client during a predetermined time period.

35. The method of claim 25 wherein the accessed session restricts the client's interactions with the matching host to interactions specified by the configuration parameters.

36. The method of claim 25, further comprising disconnecting the matching host and the accessed session upon receipt of a disconnection request.

37. The method of claim 25, further comprising sending an error message to the client if the accessed session cannot be allocated to the client.

38. The method of claim 25, further comprising:
storing the collection of session names in a data repository;
storing the collection of host names in the data repository;
storing information pertaining to completed connections between matching hosts and sessions in the data repository; and
restoring connections between matching hosts and sessions using information in the data repository if connections are terminated unintentionally.

39. The method of claim 25 wherein data passage between the session and the client is serialized to a linear stream.

40. The method of claim 25, further comprising combining more than one session from the collection of sessions together to form a pool session having a session name, and wherein a connection request having the session name for the pool session will allocate a session within the pool session to the client.

41. The method of claim 40 wherein the session allocated from the pool session is selected on a first-in-first-out (FIFO) basis.

42. The method of claim 40 wherein a session within the pool session may be reserved for priority use.

43. The method of claim 25 wherein if a session cannot be accessed having the matching name from the collection of session names, then creating a session according to other data provided in the connection request.

44. The method of claim 25, further comprising performing a logon sequence with the matching host.

45. The method of claim 25, further comprising performing a logoff sequence with the matching host after receiving a disconnection request from the client.

46. The method of claim 25 wherein if multiple connection requests are received for the same host name, then dedicating a session to the matching host.

47. A session allocation manager, comprising:
a first interface that transmits instructions for creating and controlling sessions, wherein each session contains directions for managing data communications between a client of a plurality of clients and a host of a plurality of hosts;
a second interface that accesses a requested session and allocates the requested session to the client of the plurality of clients that has requested the requested session; and
a third interface that establishes a communications link with the host of the plurality of hosts according to instructions provided by at least one session of the sessions and makes the communications link available to the at least one session of the sessions.

48. The session allocation manager of claim 47 wherein operations of the first interface are controlled by first control parameters, operations of the second interface are controlled by second control parameters, and operations of the third interface are controlled by third control parameters, further comprising a fourth interface that receives and processes control messages that alter at least one of the first control parameters, second control parameters, and third control parameters.

49. The session allocation manager of claim 47 wherein the first interface transmits instructions for storing the session in a data repository.

50. The session allocation manager of claim 47 wherein the host is a screen-based host application and the first interface contains directions for managing data communications to the screen-based host application.

51. The session allocation manager of claim 47 wherein the host is a customer information control system ("CICS") and the first interface contains directions for managing data communications to the CICS host application, wherein the CICS is a computing system that allows transactions entered at a remote computer to be processed concurrently by a mainframe host computer.

52. In a computing system performing a method for managing multiple connections between clients and hosts, a computer-readable medium having a data structure, comprising:
a first data field that holds instructions for creating and controlling a plurality of sessions, wherein each session contains directions for managing data communications between a client and a host;
a second data field that holds instructions for accessing a session of the plurality of sessions and allocating the session to a client that has requested the session;
a third data field that holds instructions for establishing a communications link with the host; and
a fourth data field that holds instructions for making the communications link available to at least one session of the plurality of sessions.

53. The computer-readable medium recited in claim 52, further comprising:
a fifth data field that holds instructions for controlling messages passing between the host and client and for altering instructions in the first, second, third, and fourth data fields.

* * * * *